United States Patent [19]

White

[11] Patent Number: 4,852,067
[45] Date of Patent: Jul. 25, 1989

[54] LOW FREQUENCY SONIC LOGGING

[75] Inventor: James E. White, Golden, Colo.

[73] Assignee: Schlumberger Well Services, Houston, Tex.

[21] Appl. No.: 499,569

[22] Filed: May 31, 1983

[51] Int. Cl.⁴ ............................................. G01V 1/00
[52] U.S. Cl. ........................................ 367/31; 367/57
[58] Field of Search ............... 367/117, 129, 31, 32, 367/33, 75, 56, 57; 181/112, 102, 103; 364/421, 422

[56] References Cited

U.S. PATENT DOCUMENTS

| | | | |
|---|---|---|---|
| 3,080,010 | 3/1963 | Blizard | 367/31 |
| 3,434,563 | 3/1969 | Zemanett | 181/104 |
| 3,483,505 | 12/1969 | Adair et al. | 367/31 |
| 3,876,971 | 4/1975 | Wuenschel | 181/102 X |
| 3,991,850 | 11/1976 | Escaron | 181/102 |
| 4,131,875 | 12/1978 | Ingram | 367/35 |
| 4,134,097 | 1/1979 | Cowles | 181/102 X |
| 4,432,077 | 2/1984 | Alhilali et al. | 367/31 |

OTHER PUBLICATIONS

Huang and Hunter, Correlation of "Tubewave" Events with Open Fracture; Part A, Geological Survey Canada, Paper 81-1A, pp. 361-376, 1981.

Emmett Riggs, "Seismic Wavetypes in boreholes", Geophysics, vol. 20, No. 1., Jan. 1955, pp. 60-67.

Hardage, "Examination of Tube Wavenoise in Vert. Seismic Profiling", Geophysics, vol. 46, No. 6, Jun. 1981, pp. 892-903.

R. L. Morris, "Use of Compressional and Shear Acoustic Amplitude", paper #SPE-723, Soc. Petra Engin., Oct. 6-9, 1963, p. 1.

J. E. White, "Seismic Waves", McGraw-Hill, 1965, p. 2.

Primary Examiner—Brian S. Steinberger
Attorney, Agent, or Firm—Henry N. Garrana; John H. Bouchard

[57] ABSTRACT

Methods and apparatus are described utilizing low frequency tube waves in determining characteristics of formations traversed by a borehole. Data received from three spaced receiving transducers are utilized in formulating quantities representative of complex compressibility of formations as well as loss parameters attributed to formation characteristics. When these two factors are recorded as a function of depth, interpretation is made readily available as to the permeability and rigidity of subsurface earth formations. Data is also provided by way of the present invention to enable interpretation concerning the presence of fractures or cracks in the earth formations. The methods and apparatus may also be utilized to examine the condition of casing in a borehole.

12 Claims, 3 Drawing Sheets

LOW FREQUENCY SONIC LOGGING

DESCRIPTION

1. Technical Field

This invention relates to methods and apparatus for low frequency sonic logging utilizing tube waves to produce indications of conditions surrounding a borehole.

2. Background of Invention

There has long been an interest in and efforts made toward establishing measured values for formation rigidity, of value in shear-wave reflection prospecting, as well as for permeability and other lithologic parameters. Interest has also been expressed in determining the location of cracks or fractures in earth formations traversed by a borehole. These efforts and interests have given rise to techniques such as that performed by sonic devices of the type described in U.S. Pat. No. 3,434,563. These techniques involve the use of high frequency acoustic energy for locating anomalies, such as fractures, in formations traversed by a borehole.

Sonic logging information contained in compressional and shear acoustic amplitudes has also been described as useful in determining the presence of fractures. In a paper entitled "The Use of Compressional and Shear Acoustic Amplitudes for the Location of Fractures" by R. L. Morris et al, Paper No. SPE-723, presented at the Thirty-Eighth Annual Fall Meeting of the Society of Petroleum Engineers of the American Institute of Mining, Metallurgical and Petroleum Engineers in New Orleans, La., Oct. 6–9, 1963, the authors describe such a technique. However, experience of the authors has shown that the involved amplitude measurement is not universally applicable. The interpretation of amplitude logs is complicated by the many variable factors encountered in actual logging operations.

It is well known that the speed of low frequency waves in a borehole is governed by the compressibility of the fluid in combination with the rigidity of the material surrounding the borehole. In the case of earth formations, if the rock around the borehole is lossy then the attenuation of these waves can be expressed in terms of complex shear rigidity. If the rock around the borehole is also permeable, there are introduced additional losses for waves traveling along the borehole. These effects can be grouped under the concept of a complex compressibility for the fluid wherein the speed and the attenuation of waves along the hole are influenced by fluid properties, shear rigidity and permeability. The concept of complex compressibility is described in a text entitled "Seismic Waves" by J. E. White, and published by McGraw-Hill in 1965. Reference is had to pages 148–160 of the text and particularly to expression 4–15 at page 158.

That low frequency waves can be generated in a borehole is reported in a paper entitled "An Examination of Tube Wave Noise in Vertical Seismic Profiling Data" by B. A. Hardage appearing in the June 1981 issue of Geophysics at pages 892–903. There the author describes problems encountered in Vertical Seismic Profiling by the presence of tube waves which camouflage upgoing and downgoing body wave events thus acting as noise. The source of energy utilized was a vibrator whose output was swept over a predetermine frequency range. The effect of tube wave noise was reduced by increasing the offset of the source from the top of the wellbore.

DISCLOSURE OF THE INVENTION

The present invention relates to methods and apparatus utilizing low frequency sonic energy to provide indications of conditions of materials surrounding a borehole. Where the borehole is surrounded by earth formation, the conditions sensed include that of permeability, shear rigidity and, from the correlation of these latter conditions or parameters, an indication can be obtained of the presence of fractures in the earth formations traversed by the borehole. Where the material surrounding the borehole is casing, indications will be obtained of casing conditions such as weakened walls and the presence of holes penetrating the casing.

More particularly, the method of the present invention comprises the steps of establishing continuous tube waves within a borehole with the tube waves having a fundamental frequency selected from the range of 20–100 hertz. The appearance of the tube waves is detected at three or more spaced apart locations within the borehole. Electrical signals are produced representative of the characteristics of the detected tube waves and these signals processed to generate indications of conditions of the material surrounding the borehole. In one embodiment, the particle velocity of the tube waves is detected at two outer locations and the pressure of the tube waves is detected at a center location. In another embodiment, the pressure of the tube waves is detected at all three locations.

In carrying out the processing of the electrical signals, the electrical signals from the two outer locations are subtracted one from the other and the ratio taken of the average of the absolute value of the difference with respect to the average of the absolute value of the electrical signal from the center location to produce a signal representative of the magnitude of the complex compressibility of the material adjacent three locations.

The product of the difference signal and the signal from the center location is averaged and a ratio is taken of this product with respect to the average of the square of the signal from the center location to produce a signal representative of the complex compressibility, as well as the losses or attenuation. Now, by taking a ratio of the second derived signal, including a representation of compressibility and the losses or attenuation with respect to the earlier derived complex compressibility, there is obtained a function representative of the value of the losses or attenuation. These functions of complex compressibility and losses are separately plotted as a function of depth along the borehole to produce a log and, thereby, provide information concerning the shear rigidity and the permeability, as well as the presence or absence of fractures in the earth formations.

BEST MODES FOR CARRYING OUT THE INVENTION

Figure 1:
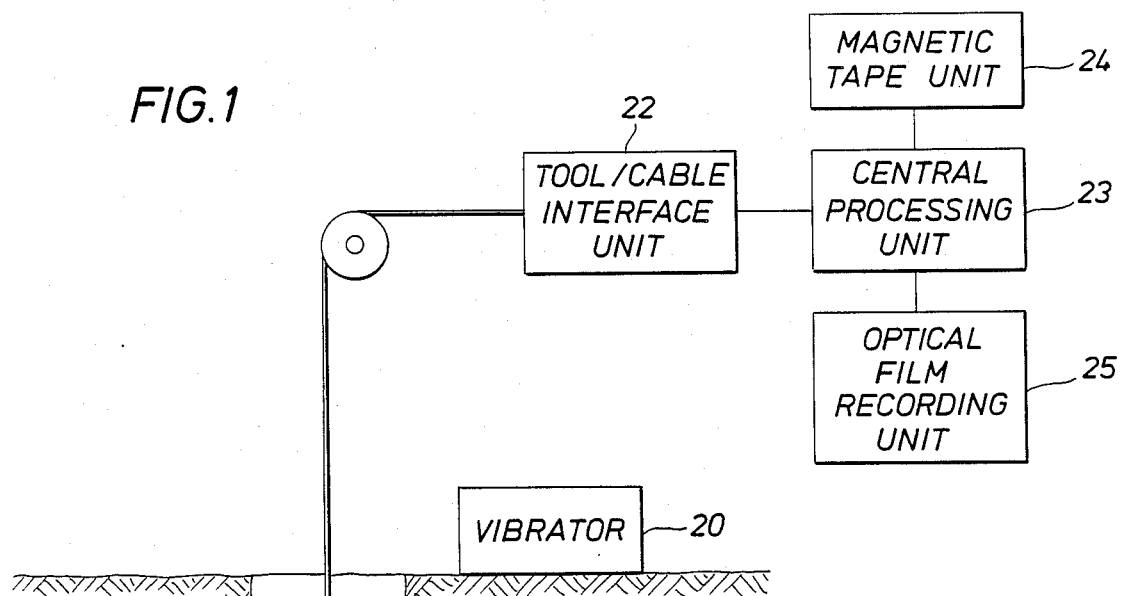
FIG. 1 is a schematic of a system useful in the practice of the present invention.

Referring now to the drawings and specifically to FIG. 1, there is depicted a borehole 10 traversing a formation 11 having a fracture or crack 12. A sonde or logging tool 13 is suspended within the bore hole 10 by way of cable 15. The sonde includes three transducers R1, R2 and R3. In one arrangement of the embodiment illustrated in FIG. 1, the transducers R1 and R3 are particle velocity detectors such as geophones, and the transducer R2 is a pressure detector such as a hydrophone. The transducers R1 and R3 are spaced apart from 2 to 20 feet, preferably about 4 feet, and the transducer R2 is centrally located between them. In another arrangement of the embodiment of FIG. 1, the transducers R1, R2 and R3 are all pressure transducers. The same spacing criteria pertain. Bow-spring centralizers (not shown) are utilized to maintain the sonde 13 centered in the borehole 10.

Tube waves are established within the borehole 10 by utilization of a suitable continuous wave sound source such as vibrator 20 located at the surface of the earth nearby the borehole 10. The vibrator 20 is programmed to generate a continuous wave of sonic energy having a fundamental frequency selected from the range of 20–100 hertz. The tube waves established within the borehole, appear at and are detected by the transducers R1, R2 and R3.

The mode of transmission up the cable may be either analogue or digital. If it is digital, the amplified waveform values are sampled at a regular prescribed non-aliasing rate, typically 200 to 2000 times per second, then digitized in the electronic cartridge 14. They are then telemetered up the cable 15 as a sequence of binary numbers. If the transmission is analogue, the amplified waveforms are passed directly up the cable 15 and digitized in the surface equipment. The surface equipment typically includes a tool/cable interface unit 22, a central processing unit 23, a magnetic tape recording unit 24, and an optical film recording unit 25 and other equipment. The program executing in the central processing unit 23 is responsible for issuing commands to the tool or sonde 13 through the tool/cable interface unit 22 for the performance of whatever tasks are desired to take place downhole.

The central processing unit 23 also retrieves the waveform data, either from a telemetry module in the tool/cable interface unit 22 if digitization is done downhole, or from a digitizer module in the tool/cable interface unit 22 if analogue transmission is used. In either case, these waveform data are recorded using the magnetic tape recording unit 24. The program may actually process the waveform data at the well site utilizing the technique described hereinafter and record the resulting complex compressibility and losses using the optical film recording unit 25. Otherwise, processing is performed by a central processsing unit located in a remote center using the tapes of the waveform data.

The signals from receiving transducers R1, R2 and R3 are initially processed to generate an electrical signal E1. Where the receiving transducers are comprised of two geophones and a pressure detector, the signal E1 is the difference between the instantaneous values of the signals from the velocity detectors or geophones R1 and R3. A second electrical signal E2 represents the output from the pressure detector or transducer R2. It is obvious that the generation of the signals E1 and E2 can take place downhole in the electronic cartridge 14. In that event, the signals E1 and E2 are transmitted by way of the cable 15 and the tool/cable interface 22 to the computer processing unit 23. It will be preferred, hwever, to telemeter the signals from transducers R1, R2 and R3 to the surface where they will be recorded by the magnetic tape recording unit 24 and available for processing at a remote center if so desired.

Figure 3:
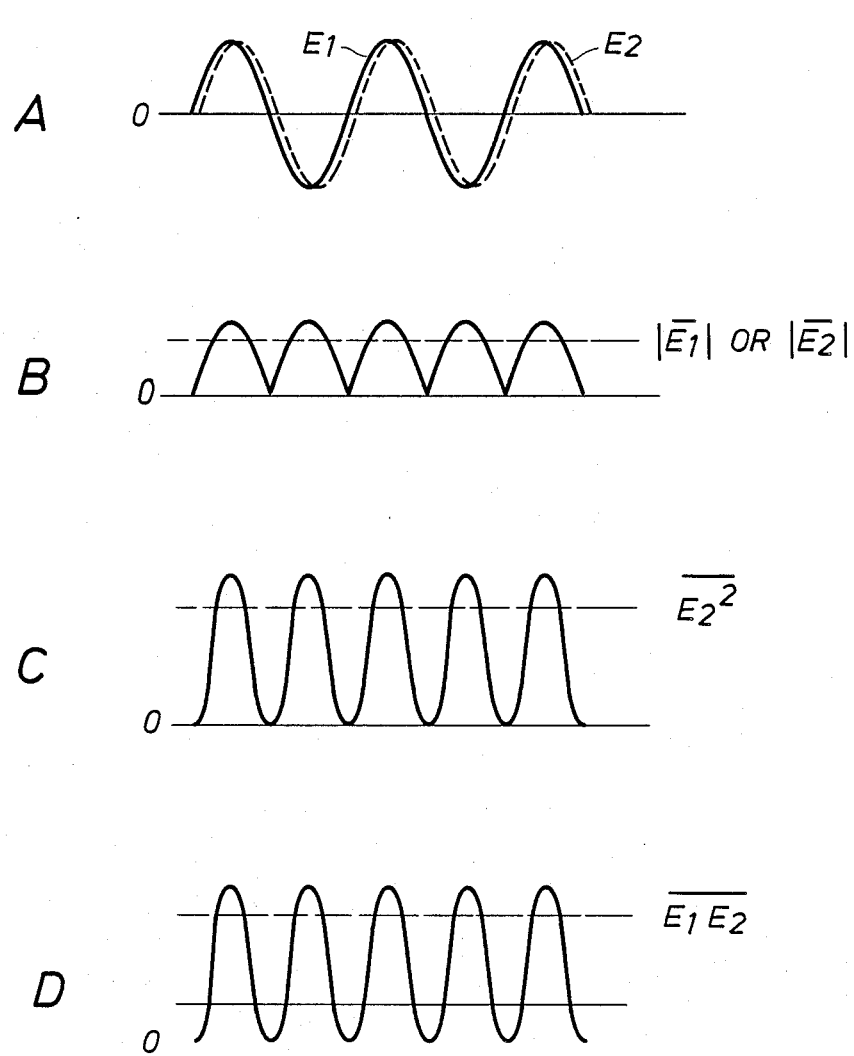
FIG. 3 is a schematic representation of wave forms of the signals generated during the course of the practice of the present invention.

The signals E1 and E2 generated either downhole or at the surface are shown in FIG. 3A in an analogue representation for ease of understanding, it being understood that in practice, they will be digital. These signals are processed in accordance with the present invention to produce indications of conditions of the material surrounding the borehole 10.

Figure 4:
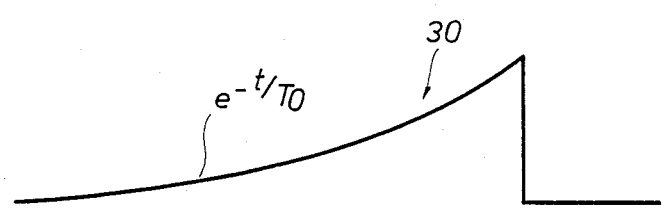
FIG. 4 represents the characteristic of the window utilized in averaging the data produced during the course of practicing the present invention.

The first step in the processing of signals E1 and E2 is to rectify E1, as shown in FIG. 3B, and convolve rectified signal with a weighted window 30 having a decreasing exponential characteristic, as shown in FIG. 4, so as to obtain a weighted averaged absolute value of E1 or $\overline{|E_1|}$. The purpose of utilizing a weighted window is to attribute the greatest significance to the most recent measured signal as the tool is moved along the borehole. With this realization, it becomes apparent that though it is preferred to use a weighted window having an exponential characteristic $$e^{-\frac{t}{T_o}}$$

where t is the present time and To is the effective time length of the window, other weighted functions may be utilized as windows or moving average operators to achieve the desired end result.

The next step is to rectify voltage E2 to the form shown in FIG. 3B and to convolve this rectified voltage with the same window or moving average operator having a decreasing exponential characteristic and thus produce a signal representative of an absolute value for E2 or $\overline{|E_2|}$. The ratio of the averaged absolute value of E1 to the averaged absolute value of E2 then yields a quantity Y1 which is proportional to the magnitude of the complex compressibility. This quantity $Y_1$ is represented by the expression:

$$Y1 = \omega \Delta z C \tag{1}$$

where $\omega = 2\pi f$ f = frequency of the detected tube wave $\Delta z$ = spacing between the transducer R1 and R3; and C = magnitude of the complex compressibility Division of expression (1) by $\omega \Delta z$, the value of which is known, in fact, yields a quantitative value of the magnitude of complex compressibility C.

Next there is determined a value for the losses L. This entails initially the multiplication of the instantaneous value of the signal E1 by the instantaneou value of the signal E2 and the convolution of this product with the window or moving average operator 30 of FIG. 4 to obtain $\overline{E1\ E2}$.

The instantaneous values of E2 are squared to obtain $E2^2$, as shown in FIG. 3C, convolved with the window 30 of FIG. 4 to obtain $\overline{E2^2}$. The ratio $$\frac{\overline{E1\ E2}}{\overline{E2^2}} \quad (2)$$

yields a quantity Y2 proportional to the loss parameter $\sin\theta$ or L. The quantity Y2 is represented by the expression:

$$Y2 = \omega \Delta z C \sin\theta \quad (3)$$

where $\sin\theta$ is the loss parameter. A quantitative value of the loss parameter is obtained by taking the ratio $$\frac{Y2}{Y1} = \frac{\omega \Delta z C \sin\theta}{\omega \Delta z C} = \sin\theta = L \quad (4)$$

Figure 5:
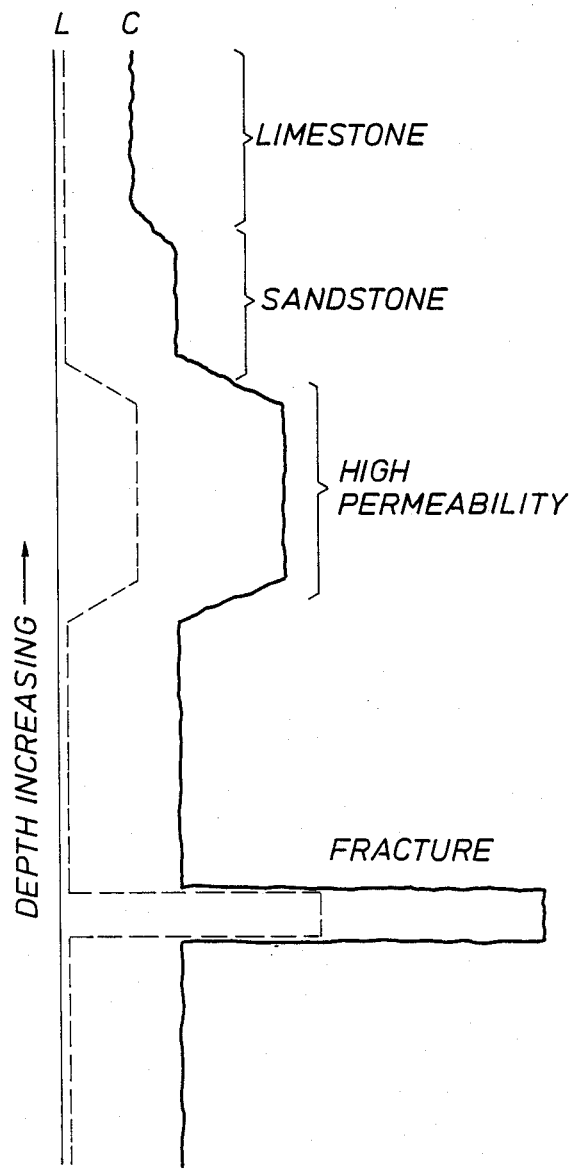
FIG. 5 is representative of a log produced in accordance with the present invention depicting zones of high permeability and also the presence of a crack.
Figure 6:
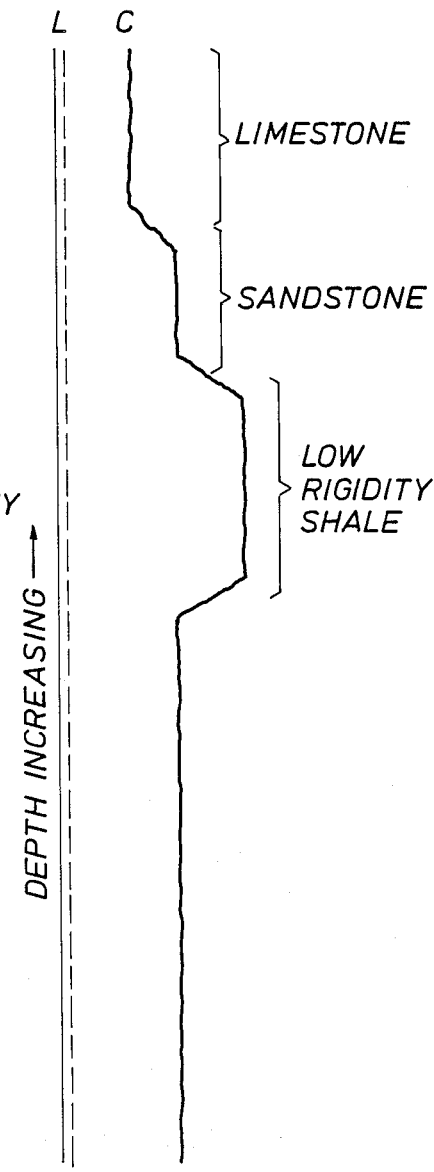
FIG. 6 is a log generated in accordance with the present invention depicting variation in log parameters in zones including a zone of low rigidity.

The determined values of C and L are plotted as a function of tool depth along the borehole to produce logs of the type illustrated in FIGS. 5 and 6 where the ordinate represents depth along the borehole and the value of compressibility C and the values of the loss parameter L are plotted along the abscissa.

As shown in FIG. 5, a limestone formation will exhibit values of compressibility C that are relatively low. The values of the Losses L will also be low. When the tool encounters a sandstone formation of low permeability, the value of compressibility C gradually increases in the transition from limestone to sandstone; however, the values for the loss parameter L remain substantially the same. Now, as there is encountered a zone of high permeability, the value of the compressibility C gradually increases to a value much higher than that previously encountered in limestone or sandstone and, at the same time, the value of the loss parameter L also increases. Accordingly, the correlation as between the two traces or logs L and C gives an interpreter a tool for accurate evaluation or interpretation of downhole conditions as they relate to rigidity and permeability.

Further in FIG. 5, upon the traverse of a crack or fracture 12 (FIG. 1) in the formation, the value of compressibility C will suddenly change to a very, very high value and so will the value of the loss parameter L. The presence of a crack can be immediately distinguished from zones of high permeability by noting the nature of the transition of the traces. It is observed that in the zone of high permeability, the transition is gradual to final values; whereas, in the presence of a crack, the change is a step or abrupt function. The change in value of C and L, in the presence of a crack, occurs immediately upon one of the transducers R1 or R3 traversing the crack and this signal level stays high until the last transducer passes the crack. Hence, for all practical purposes no matter how wide the crack, the log will have a high value, in the area of the crack, whose duration will be determined by the spacing between the outer transducers R1 and R3.

FIG. 6 illustrates a log produced in accordance with the present invention where the formations being traversed by the wellbore are of varying degrees of rigidity. In this case, there is noted a gradual increase in compressibility C from the limestone into the sandstone and a further increase into a zone of low rigidity, for example, a shale. It is to be noted that in cases where there is low permeability, as illustrated in FIG. 6, the value of the loss parameter L remains fairly constant at a low level enabling an interpreter to distinguish between zones of high permeability and zones of low rigidity.

Having now described one complete embodiment of the present invention, attention is again directed to FIG. 1 for a description of a second embodiment wherein the detectors R1, R2 and R3 are all pressure transducers or hydrophones. In this instance, the signals generated by the transducers R1, R2 and R3 are processed either downhole or at the surface to produce

$$E1 = R1 + R3 - 2R2 \quad (5)$$

As in the first embodiment, the signal E2 is equal to the output from transducer R2. Signals E1 and E2 are separately rectified as shown in FIG. 3B and averaged by convolving the absolute rectified values with window of FIG. 4 to produce $\overline{|E1|}$ and $\overline{|E2|}$. The ratio of $\overline{|E1|}$ and $\overline{|E2|}$ produces a function X1 which is proportional to the magnitude of the complex compressibility C as shown in the following expression $$\frac{\overline{|E1|}}{\overline{|E2|}} = \frac{\rho \omega^2 \Delta z^2}{4} C = X1 \quad (6)$$

where $\rho$ is the value of drilling fluid or mud density.

The value of the mud density $\rho$ can be determined by well-known techniques. In typical cases, the mud density is a constant along the length of the borehole. That being the case, the expression $$\frac{\rho \omega^2 \Delta z^2}{4} \quad (7)$$

is a constant and by dividing expression (6) by this constant, there can be obtained a quantitative value for the complex compressibility C.

Having derived a value for complex compressibility, there is now undertaken the steps to generate values for the loss parameter $\sin\theta$ or L. As an initial step, the instantaneous values of E1 are averaged by convolution with the window 30 of FIG. 4 to generate a signal or function $\overline{E1}$. The function $\overline{E1}$ is multiplied with the instantaneous values of E2 and the product convolved with the window 30 to produce the signal or function $\overline{E1\ E2}$.

The instantaneous values of the signal E2 are now squared and convolved with the window of FIG. 4 to produce the function $\overline{E2^2}$. The ratio of the averaged product function with the averaged squared function is proportional to the loss parameter $\sin\theta$ or L in accordance with the following expression $$\frac{\overline{E1\ E2}}{\overline{E2^2}} = \rho \omega \Delta \frac{z^2}{4} C \sin\theta = X2 \quad (8)$$

The quantitative value for the losses $\sin\theta$ or L is obtained by taking the ratio of expression 5 to expression 4 and multiplying the expression by $\omega$ or stated otherwise $$\frac{X2}{X1} \omega = \sin\theta = L \quad (9)$$

The output quantities C and L generated in accordance with the second embodiment are like the output quantities C and L generated in accordance with the first embodiment. They give substantially the same information when recorded as a function of depth to produce logs of the type illustrated in FIGS. 5 and 6. This being the case, there is no need to repeat the description of the logs of FIGS. 5 and 6.

The value of To, a parameter utilized in the determination of the exponential characteristic of the window of FIG. 4 is approximately 20 times the period of the frequency selected for the generation of the low frequency tube waves.

Figure 2:
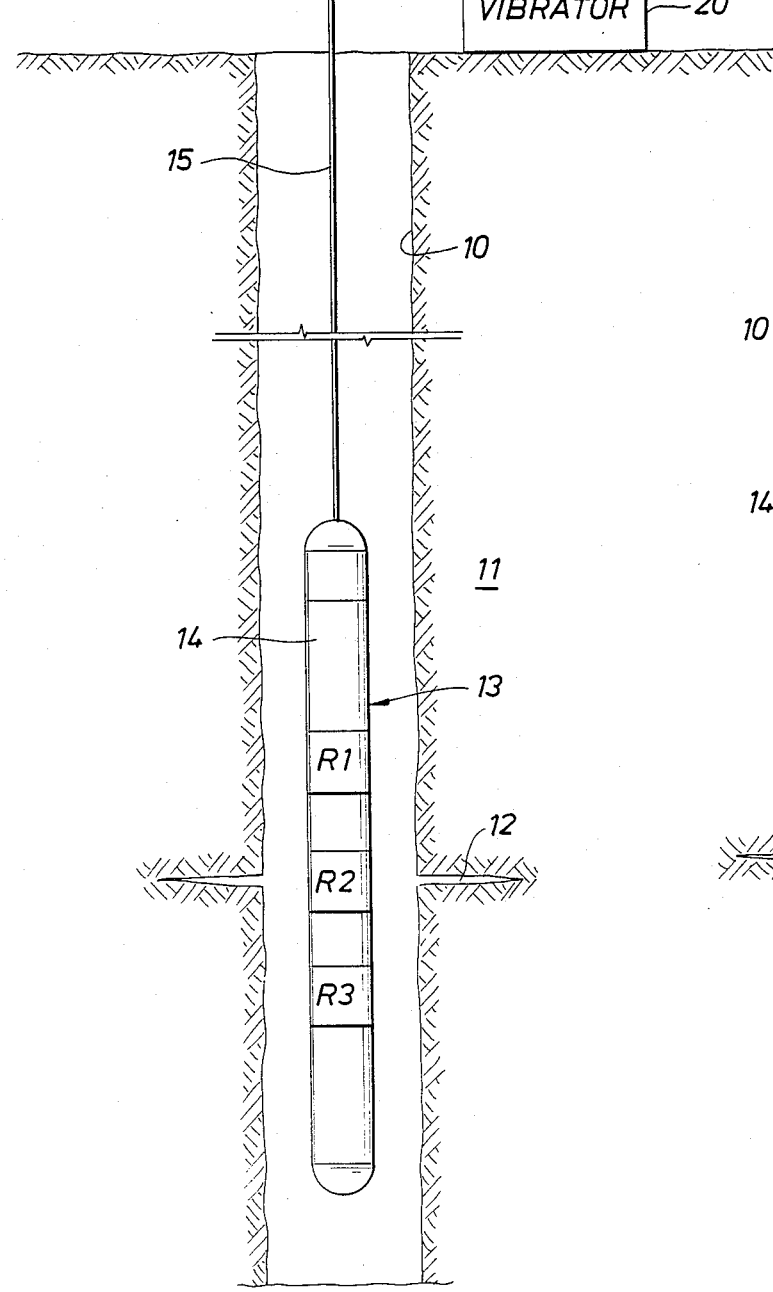
FIG. 2 is a modification of the system of FIG. 1.
Figure 2:
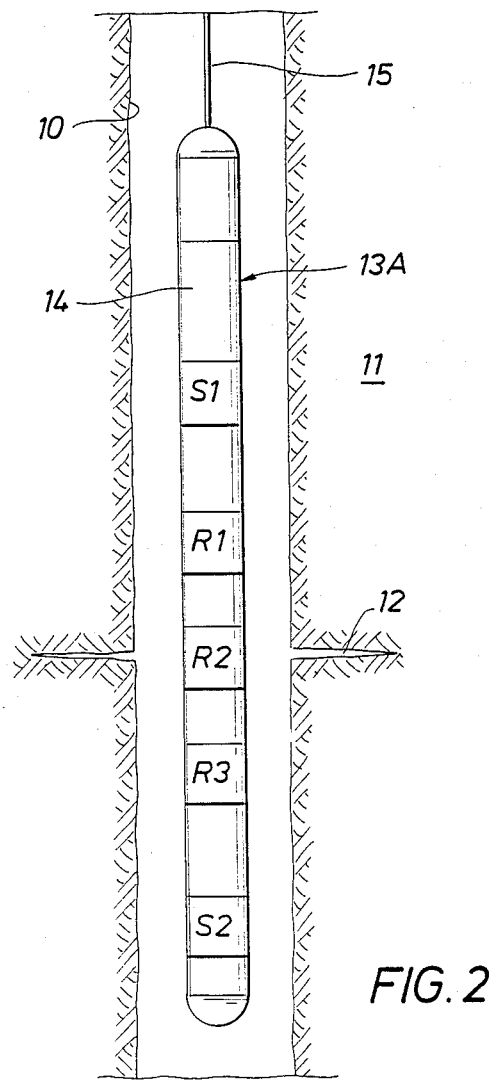

Referring now to FIG. 2, there is illustrated a downhole tool 13A embodying a modification wherein the tube waves are established in the borehole 10 through the utilization of two spaced sound sources S1 and S2. The transducers R1, R2 and R3 are the same as the transducers utilized in the embodiment of FIG. 1 and are located between the sound sources S1 and S2 with the distance between sound source S1 and transducer R1 being equal to the distance between the sound source S2 and the transducer R3. The sound sources have a continuous low frequency output and are operated in phase in establishing the tube waves in the borehole. The sound sources S1 and S2 may be of the electromechanical type or any type or form of low frequency continuous wave downhole sound source which will produce sonic energy in the range of from 20–100 hertz.

In one arrangement of the tool 13A, the transducers will comprise two velocity detectors R1 and R3 and a pressure detector R2. In another arrangement, the transducers will be comprised of three pressure detectors. In the described arrangements of sources and detectors, the data produced from the tool 13A will be essentially the same data produced by the tool 13 of FIG. 1 and these data are processed in exactly the same manner as above described to produce quantitative values of the complex compressibility C and the loss parameter L.

The downhole sound source arrangement assures that the receivers R1, R2 and R3 are always in an optimum detecting position in that the maximum pressure always exists in the vicinity of transducer R2 and the motion of the drilling mud is always near a minimum. This means that in the first arrangement where the signal E1 represents the difference between signals produced by transducers R1 and R2, the difference signal is of the same order of magnitude as the individual signals from the transducers R1 and R3. This also means that in the second arrangement where the signal E1 is equal to the sum of the signals from transducers R1 and R3, less twice the signal from transducer R2, the output signal E1 is a maximum with respect to the magnitude of pressure in the vicinity of the transducer R2.

The methods and apparatus of the present invention have thus far been described principally with regard to logging open hole and determining characteristics of earth formations as well as determining the presence of fractures or cracks. It will be evident to those skilled in the art that the same techniques employed in open hole logging can be utilized in logging a cased hole for the purpose of examining the condition of the casing. The rigidity factor in the cased hole will be determined by the thickness of the casing and, therefore, should the casing be weakened in any way by corrosion or other causes, the casing walls will be less rigid and give rise to a characteristic signal indicative of this condition. Likewise, should there happen to be holes formed in the casing, a signal will be produced similar to that which is generated in the presence of cracks when logging open hole.

Now that the invention has been described, further variations and modifications will occur to those skilled in the art. It is intended that such modifications and variations be encompassed within the scope of the appended claims.

What is claimed is:

1. A method of sonic logging comprising the steps of establishing continuous tube waves within a borehole traversing earth formations, said tube waves having a fundamental frequency selected from the range of 20–100 hertz, displacing through the borehold a means for detecting the appearance of said tube waves at at least three spaced apart locations within said borehole, producing electrical signals representative of the characteristics of the detected tube waves, and processing said electrical signals to generate indications of conditions of materials surrounding the borehole as a function of depth of said locations in which the borehole is an open hole, the materials surrounding the borehole are earth formations and the particle velocity of the tube waves is detected at two outer locations and the pressure of the tube waves is detected at a center location in which the electrical signals from the two outer locations are substracted one from the other and a ratio taken of the averaged difference |E1| with respect to the averaged electrical signal from the center location |E2| to produce an output signal representative of the magnitude of the complex compressibility of the earth formation adjacent said three detecting locations.

2. A method of sonic logging comprising the steps of establishing continuous tube waves within a borehole traversing earth formations, said tube waves having a fundamental frequency selected from the range of 20–100 hertz, displacing through the borehole a means for detecting the appearance of said tube waves at at least three spaced apart locations within said borehole, producing electrical signals representative of the characteristics of the detected tube waves, and processing said electrical signals to generate indications of conditions of materials surrounding the borehole as a function of depth of said locations in which the borehole is an open hole, the materials surrounding the borehole are earth formations and the particle velocity of the tube wave is detected at two outer locations and the pressure of the tube waves is detected at a center location and which comprises the steps of subtracting the electrical signals from the two outer locations one from the other to produce a signal E1, generating the product the instantaneous values of E1 with the instantaneous value of a signal E2 derived from said detection of pressure, convolving said product with a weighted moving average operator to produce a first function E1 E2, squaring the instantaneous values of the signal E2 and convolving with said operator to produce a second function E2hu 2, taking the ratio of said first function with respect to said second function to produce a first output signal, said first output signal being proportional to a loss parameter L reflecting the acoustic loss introduced by the characteristics of the earth formation adjacent said three detecting locations.

3. The method of claim 2 in which said signal E1 is rectified and convolved with said weighted moving average operator, said signal E2 is rectified and convolved with said moving average operator, and the ratio of the averaged values of the signal E1 with respect to the averaged values of the signal E2 is taken to produce a second output signal representaive of the magnitude of the complex compressibility C of the earth formation adjacent said three detecting locations.

4. The method of claim 3 including the step of taking the ratio of said first output signal with respect to said second output signal to produce a third output signal, said third output signal being representative of said loss parameter L.

5. The method of claim 2 in which said weighted moving average operator is a weighted window having an exponential characteristic $$e^{-\frac{t}{T_o}}$$

where t is time and $T_o$ is the affective time length of said operator.

6. A method of sonic logging comprising the steps of establishing continuous tube waves within a borehole traversing earth formations, said tube waves having a fundamental frequency selected from the range of 20–100 hertz, displacing through the borehole a means for detecting the appearance of said tube waves at at least three spaced apart locations within said borehole, producing electrical signals representative of the characteristics of the detected tube waves, and processing said electrical signals to generate indications of conditions of materials surrounding the borehole as a function of depth of said locations in which the borehole is an open hole, the materials surounding the borehole are earth formations and the pressure of the tube waves is detected at at least three locations and which comprises the steps of subtracting twice the signal from the central location from the sum of the electrical signals from the outer two of the three locations to produce a signal E1, rectifying said signal EI and convolving it with a weighted moving average operator to produce weighted average absolute values of said signal $\overline{|E1|}$, producing a signal E2 representative of the pressure signal detected at the center one of said locations, rectifying said signal E2 and convolving it with said weighted moving average operator to produce weighted average absolute values of said signal $\overline{|E2|}$ taking the ratio of said average values of E1 to the average values of said signal E2 to produce an output signal, said output signal being representative of the magnitude of the complex compressibility C of the earth formations adjacent said three detecting locations, and recording said output signal as a function of depth.

7. The method of claim 6 wherein said moving average operator is weighted in accordance with expression $$e^{-\frac{t}{T_o}}$$

where
t is time, and
To is the effective time length of said operator.

8. The method of claim 6 in which the output signal is expressed as $$\rho\omega^2 \frac{\Delta z^2 C}{4}$$

where
$\rho$ is mud density
$\omega$ is $2\pi f$
f is the frequency of the tube wave
$\Delta z$ is the distance between the outer pressure sensing locations, and
C is the complex compressibility.

9. The method of claim 6 including the steps of multiplying the instantaneous values of the signal E1 and the instantaneous values of the signal E2 to produce product values, convolving the product values with said weighted moving average operator to generate average values of said product, squaring the values of the signal E2 to produce a squared function, and taking the ratio of the average values of said product to average values of said squared function to produce output signals, said output signals being proportional to a loss parameter reflecting the acoustic loss introduced by the characteristics of the earth formation adjacnet said three detecting locations.

10. The method of claim 9 in which the output signals are represented as $$\rho\omega\Delta z^2 C \sin\theta$$

where
$\rho$ is mud density,
$\omega$ is $2\pi f$,
f is the frequency of the tube waves,
$\Delta z$ is the distance between the outer pressure sensing locations,
c is complex compressibility, and
$\sin\theta$ is the loss parameter.

11. The method of claim 9 in which the loss parameter is determined by taking the ratio between said output signals proportional to the loss parameter and said output signals representative of complex compressibility, multiplying said ratio by 2 times the frequency of the tube waves, and recording the product as a function of depth along the borehole.

12. The method of claim 6 in which the complex compressibility is determined by the steps including dividing the output signal by the function $$\rho\omega^2 \frac{\Delta z^2}{4}$$

where
$\rho$ is mud density
$\omega$ is $2\pi f$
f is the frequency of the tube wave, and
$\Delta z$ is the distance between the outer pressure sensing locations and recording the quotient as a function of depth along the borehole.

* * * * *